UNITED STATES PATENT OFFICE.

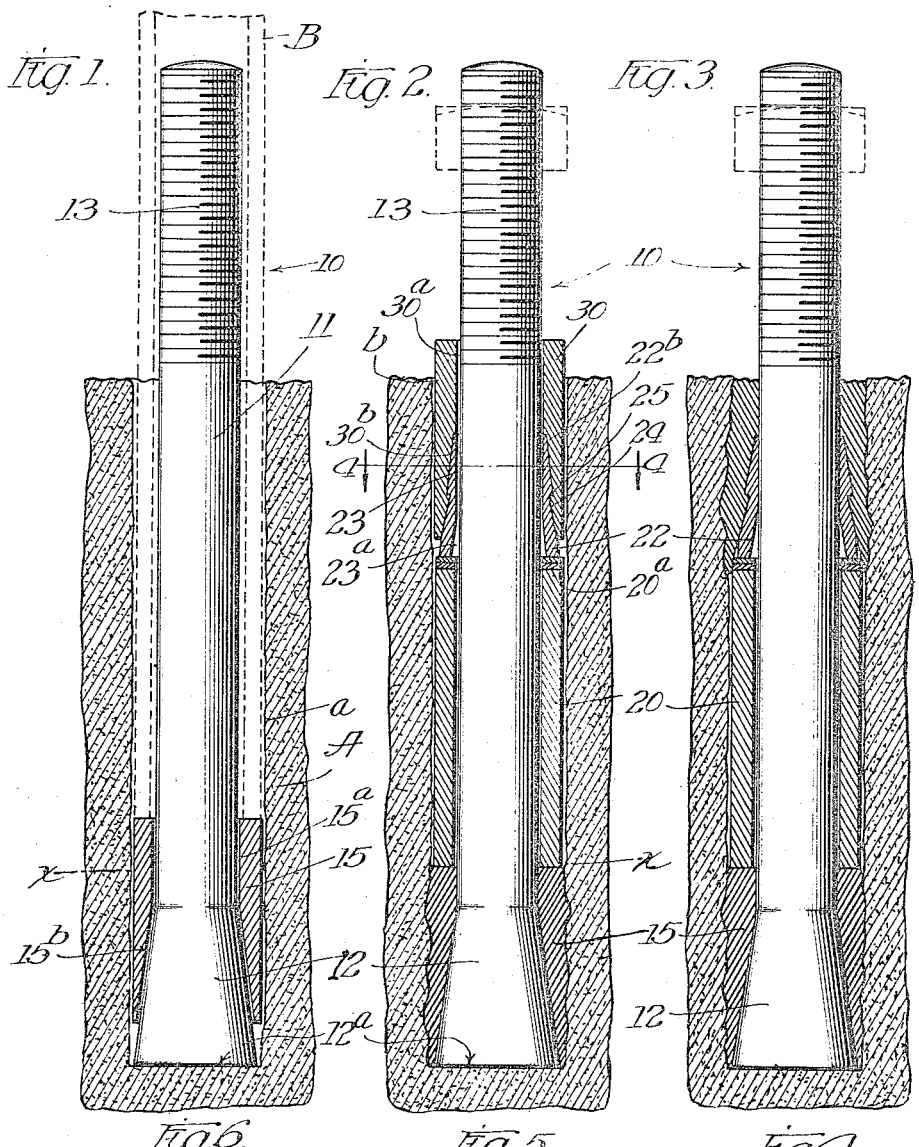

CHARLES N. ACKERMAN, OF CHICAGO, ILLINOIS.

EXPANSION-BOLT.

1,265,866.  Specification of Letters Patent.  Patented May 14, 1918.

Application filed January 31, 1916. Serial No. 75,250.

*To all whom it may concern:*

Be it known that I, CHARLES N. ACKERMAN, a citizen of the United States, residing at Chicago, in the county of Cook and State of Illinois, have invented certain new and useful Improvements in Expansion-Bolts, of which the following is a specification.

This invention relates to bolt anchors, and, in some of its features more particularly to double-anchors for securing long bolts in concrete or the like. Among the objects of the invention are to provide a construction which is simple and inexpensive, easy to use, and which gives to the anchored bolt a tenacious grip against the surrounding recess-walls, locating the gripping areas most effectively with respect to the bolt length, and effectively sealing the bolt in its respective recess so as substantially to protect the embedded metallic structure from entrance of water and resultant deterioration.

In the drawings wherein an embodiment of this invention is illustrated in one simple form for purposes of disclosure—

Figure 1 shows a bolt equipped with one anchor element positioned in a receptive recess;

Fig. 2 shows the first anchor element seated in final position, and the other anchor element loosely positioned on the bolt;

Fig. 3 indicates the bolt completely secured.

Fig. 4 is a horizontal section on line 4—4 of Fig. 2;

Fig. 5 is a side elevation of a wedge-collar, and;

Fig. 6 is a sectional view of an expansion sleeve.

The bolt, or article to be positioned, generally illustrated at 10, may take various forms, that specifically shown comprising a stem portion 11, merging at its bottom into an upwardly tapering head or lower wedge-member 12 and the opposite end of the stem being threaded as at 13. The lower wedge 12, thus conveniently made integral with the bolt stem, may effectively be made longer than its greatest diameter, and its butt $12^a$ may be nearly as great in diameter as the recess $a$ that is to receive the bolt and anchor. To secure the lower end of the bolt firmly in a recess $a$ made in a body A of rigid material, such as concrete or the like, a ductile metal sleeve 15, preferably of lead, is provided, the sleeve being preferably preliminarily shaped to interfit with portions of the stem and the lower wedge 12. Through part of its length the sleeve has a normal bore $15^a$ substantially corresponding to the diameter of the stem 11, and in its lower portion it has a tapering counterbore $15^b$ corresponding in taper with that of the head 12. The cylindrical exterior of the sleeve has an external diameter approximating that of the butt $12^a$ of the head, and preferably is of a length slightly greater than the head 12. Such a sleeve is preferably preliminarily seated self-retainingly on the bolt, normally with its lower edge somewhat more than half way down the taper of head 12, and with its upper edge correspondingly well up on the stem 11, the length of the straight-bored portion being greater than the length of wedge left exposed below the sleeve. While the bolt stem is held upright, with its butt seated firmly on the bottom of the recess $a$ this ductile sleeve 15 is driven down from the position shown in Fig. 1, to the position as indicated in Fig. 2, by means of a tubular tool indicated in dotted lines at B. As the sleeve is forced down over the tapering head it expands, making firm contact with the periphery of the recess, and it should be tamped home until it is well compacted, so that the ductile material may fill any surface irregularities in the periphery of the recess, as rather exaggeratedly shown in Fig. 2.

For short bolts, not called for too-heavy service, such a single anchor will suffice, and in that event the recess would preferably be made only about as deep as the recess-length below line $x$—$x$ of Figs. 1 and 2, so that the expanded sleeve would preferably substantially fill the recess, and seal its mouth.

A long bolt thoroughly fastened at two separated points, substantially at the bottom and at the top of a recess, is very effectively positioned, and by this invention means are provided for securing a bolt stem in the recess $a$ close to the top of said recess. Where the bolt is long, as shown in the drawings, a filler or spacer 20, preferably of rigid, non-ductile material, may be employed intervening between the expanded sleeve 15 and the stem-positioning means near the mouth of the recess. Such spacer 20 is preferably an iron tube substantially corresponding in internal diameter with the size of the stem; and in external diameter with the size of the butt 12ᶜ, so that it may fit nicely around the bolt stem and within the recess $a$. The length of such spacer, of course, may be predetermined according to its known requirements, and variations in desired length may be taken care of by the use of washers 20ᵃ or supplemental spacer members above or below the main spacer 20.

The upper anchor means, for securing the bolt stem at or adjacent the mouth of the recess $a$, and sealing the stem in such opening, comprises an upwardly-tapering wedge-collar 22, slidable on and removable from the bolt, said upper wedge being preferably of length somewhat greater than its maximum diameter, and tapering from a base 22ᵃ of a diameter substantially equal to that of the base 12ᵃ of the bolt head, to substantially the diameter of the bolt stem. Of course this collar is bored, as at 23, to fit over the stem and thus the upper edge 22ᵇ of the collar is very thin. The base end of the bore 23 may be conically enlarged as at 23ᵃ, so that the bearing against the bolt stem is reduced and localized to the tapered upper portion of the collar, and the collar may thus be made of sheet steel by drawing and punching. Exteriorly the collar may be provided with suitable irregularities of configuration into which ductile metal of sleeve 30 may flow, as shown by the shallow flat-faced notches 24 terminating at shoulders 25 that extend transversely of the collar, and by the longitudinal grooves 26 that extend axially along the collar. Supplementing the collar and preferably in normally connected relation thereto, is a ductile sleeve 30, externally cylindrical, providing the internal cylindrical bore portion 30ᵃ and the flaring counter-bore portion 30ᵇ, the flaring portion conforming to the tapered surface of the collar 22 so that the ductile sleeve extends more than half way down the collar, and so that its cylindrical portion projects above the collar a distance materially in excess of the space between the base of the collar and the base of the ductile sleeve. In manufacture, the collar and sleeve are preferably associated under pressure so that portions of the ductile metal are forced into the retaining grooves and notches 26 and 24 of the collar, while the sleeve is maintained in its cylindrical external shape and so that in use the sleeve and collar may be handled as a unit. When slipped down upon the bolt stem until the collar bottoms on the spacer 20, (or spacer extensions 20ᵃ) said collar tapers outwardly, or in the same direction as head 12 and the ductile sleeve 30 projects somewhat beyond the mouth of the recess $a$. Then with the cylindrical tamping tool B, the ductile metal is forced down and expanded until it is densely packed between the stem of the bolt and the walls of the recess $a$, and preferably is about flush with the surface of the rigid body A. So positioned, the sleeve 30 not only acts as an adequate anchor-element, strongly holding the bolt in place, but also it acts as an effective seal, closing the mouth of the recess $a$ against ingress of water and thus protecting the embedded portions of the bolt in large measure against attacks of rust.

A bolt anchored as described very strongly resists displacement, for the two complemental anchorages both resist outward draft on the bolt stem which tends, as to both tapering wedge-elements to expand the ductile metal and exert the more powerfully a grip between the bolt stem and casing-wall. Whether the walls of the recess are glass-smooth, or relatively rough (as herein shown to illustrate the spreading, void-filling, ductile character of the sleeves) the grip is so strong that heavy bolts may be set substantially immovably.

Furthermore it will be noted that as the normally-cylindrical portion of each ductile sleeve is longer than the normally uncovered area of the taper on which the sleeve seats, ample metal is provided to fill voids or to secure the bolt stem in a materially-oversized recess, and, as to the outer or leading wedge the surplus ductile metal is ample to overlie completely the thin end of the collar and make direct sealing and gripping connection between the cylindrical stem of the bolt and the walls of the recess $a$.

Also it will be apparent that since the lower portion of each ductile sleeve is tapered to quite a thin edge, while the cylindrical body of the sleeve is quite heavy and substantial, the driving home of the sleeve naturally expands its lower, weaker end first, making it grip tightly against the recess-wall before the upper, stouter portion of the sleeve is enough expanded to take its grip; and such progressive expansion, from bottom to top, results in a uniformity of grip all along the length of the sleeve that gives very superior holding qualities to the structure.

While one particular form of construction has been described herein in detail, it will be understood that many changes may be made in details of structure within the spirit of my invention and within the scope of the appended claims.

Having described my invention, what I claim is:—

1. The combination of a bolt carrying two tapering wedge members, the upper one of which is slidable on and removable from the bolt stem, and two ductile sleeves, respectively overlying the tapering portions of said wedges, said wedge-members both tapering in the same direction, the upper sleeve having a cylindrical bolt-encompassing portion and a flaringly bored wedge-encompassing portion, said flaring portion leaving normally exposed below it a portion of the wedge member shorter than the cylindrical portion of the sleeve.

2. The combination of a bolt carrying two tapering wedge members, the upper one of which is slidable on and removable from the bolt stem, and two ductile sleeves, respectively overlying the tapering portions of said wedges, said wedge-members both tapering in the same direction, each sleeve having a cylindrical bolt-encompassing portion and a flaringly bored wedge-encompassing portion, said flaring portion leaving normally exposed below it a portion of the wedge member shorter than the cylindrical portion of the sleeve.

3. The combination of a bolt having an upwardly tapering head, a ductile sleeve thereon, externally cylindrical and internally fitting contiguous parts of the head and stem; a spacer to overlie the said sleeve; a wedge collar upwardly tapering, mounted on the bolt above the spacer, and a second ductile sleeve on said collar, externally cylindrical and internally shaped substantially to conform to contiguous parts of the collar and stem.

In testimony whereof I hereunto set my hand in the presence of two subscribing witnesses.

CHARLES N. ACKERMAN.

In the presence of—
Geo. T. May, Jr.,
Mary F. Allen.